Dec. 10, 1957 S. T. SEMEGEN 2,815,957
GOLF BALL
Filed July 8, 1953
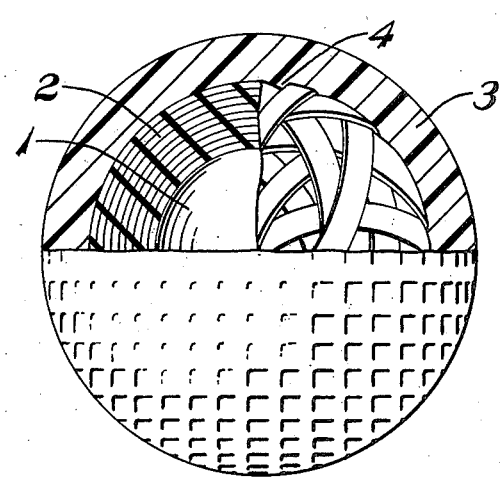
INVENTOR.
STEPHEN T. SEMEGEN
BY
ATTY.

United States Patent Office 2,815,957
Patented Dec. 10, 1957

2,815,957
GOLF BALL

Stephen T. Semegen, Cuyahoga Falls, Ohio, assignor to The B. F. Goodrich Company, New York, N. Y., a corporation of New York Application July 8, 1953, Serial No. 366,851

7 Claims. (Cl. 273—235)

This invention relates to golf balls having covers of compositions comprising a blend of rubbery material with a tough resinous material.

It is an object of this invention to provide a covering for a golf ball center so that the cover will have the necessary physical properties such as "click," resistance to cutting, toughness, and easy processability.

It is a further object to provide golf balls with covers more economically than the compositions conventionally used.

It is a still further object to provide golf balls with covers which may or may not be vulcanized.

These and other objects and advantages of the present invention will be apparent from the following detailed description, examples, and drawing.

I have discovered that a blend of a rubbery material with a tough, horny resinous material which is the polymerization product of an alkyl ester of an alkyl acrylic acid with a copolymerizable compound can be readily processed, formed and molded about a golf ball center to provide a cover having the desired characteristics, including good rebound, cut resistance, and "click." Balls covered with these compositions travel further upon being driven than do like-quality balls having conventional covers. As shown in the drawing, which is an elevation partly in section, a golf ball made in accordance with the present invention generally comprises core 1, wrapped rubber thread center 2 and a cover 3. The fused cover is shown at 4 to have melted and flowed between the outer threads of the center to provide greater adherence between the cover and center.

The cover materials are homogeneous compositions of (A) a tough, horny resinous polymeric material having a softening point of from about 150° to 300° F., and (B) a soft rubber material such as crude natural rubber or one of the synthetic rubbers such as the butadiene-polymer type. These compositions are apparently single phase as the components are compatible. These compositions have also been blended with balata compositions to provide good covers.

The resinous component (A) is a polymerization product of a mixture of two monomers, an alkyl ester of an alkyl acrylic acid and an open-chain conjugated diene copolymerizable therewith. The first monomer will be an ester of the formula

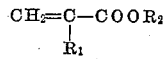

wherein $R_1$ is an alkyl group having from 1 to 3 carbon atoms and $R_2$ is an alkyl group having from 1 to 8 carbon atoms. Some of the alkyl esters of alkyl acrylic acid which are used are methyl methacrylate, ethyl methacrylate, propyl methacrylate, butyl methacrylate, isobutyl methacrylate, tertiary butyl methacrylate, tertiary amyl methacrlate, n-hexyl methacrylate, 2-ethyl hexyl methacrylate, methyl ethacrylate, ethyl ethacrylate, propyl ethacrylate, butyl ethacrylate, isobutyl ethacrylate, tertiary butyl ethacrylate, tertiary amyl ethacrylate, n-hexyl ethacrylate, 2-ethyl hexyl ethacrylate, and other similar alkacrylates. The other monomer copolymerizable with the alkyl alkacrylate ester is an open-chain conjugated diene containing from 4 to 8 carbon atoms such as butadiene-1,3, isoprene, 2,3-dimethyl butadiene-1,3, piperylene, 2-ethyl butadiene-1,3, 2-chloro-butadiene-1,3, and the like. The resinous component is made by polymerizing a mixture of the foregoing monomers containing from 60 to 90% by weight of the alkyl alkacrylate.

The rubbery component (B) of the cover composition is a vulcanizable rubber of a homopolymer of an open-chain conjugated diene monomer having from 4 to 8 carbon atoms including such natural occurring crude rubbers as caoutchouc, which is essentially a rubbery polymer of isoprene, and the like, or such synthetic rubbers as rubbery polychloroprene and rubbery polymers of the open-chain conjugated dienes having from 4 to 8 carbon atoms such as the butadiene-1,3 hydrocarbons which include butadiene-1,3, isoprene, 2,3-dimethyl butadiene-1,3, 1,4-dimethyl butadiene-1,3, and the like; or the rubbery copolymers of these open-chain conjugated diene monomers and similar material with each other or with such copolymerizable monomeric materials having a single carbon to carbon double bond as isobutylene, styrene, acrylonitrile, methacrylonitrile, methyl acrylate, methyl methacrylate, ethyl acrylate, ethyl methacrylate, 2-vinyl pyridine, and similar materials. The rubbery copolymers contain from 50 to 75% by weight of the conjugated diene.

Other ingredients may be added to the composition, among which are any of the long-chain synthetic polymeric amides, cyclicized rubber, polyethylene, etc.; and the rubbery material may be added as glue-rubber mixtures, the glue being preferably a pearl-type animal glue. Other usual rubber compounding ingredients including accelerators and vulcanizing agents may be added as desired.

After polymerization, the resinous copolymer and rubbery copolymer or polymer are mixed thoroughly on a rubber mixing mill at a temperature of about 160 to 190° F. and usually at about 180° F. until a uniform mixture is obtained. Alternatively, aqueous emulsions of the polymers may be mixed and then coagulated together.

Next pieces of the stock are cut and placed in shell forming molds and under a platen pressure of 250–500 p. s. i. pressed at a temperature of about 180° F. to form semispherical shells. The shells are allowed to cool in the molds and then removed. Instead of applying heat to the molds, the hot stock from the mill rolls, if such is used, can be placed directly in the cold molds and the requisite pressure applied. Further, if desired the mold can be heated after the hot stock is placed therein. Total heating and cooling will require approximately from 1 to 3 minutes.

Finally, golf ball centers are inserted between shells and the resulting assembly placed in golf ball cover molds, heated to a temperature of from 212 to 225° F. at platen pressures of from 250 to 500 p. s. i., and allowed to cool in the molds. The total heating and cooling cycle will be from 8 to 6 minutes. If higher temperatures are used shorter times should be used to avoid overheating the center.

The hereinabove described temperatures, times and pressures can, of course, be varied somewhat depending on the particular resinous and rubbery polymer employed and the amounts thereof with achievement of the same results.

The following specific examples will illustrate this invention with more particularity:

*Example I*

A resinous copolymer of methyl methacrylate and butadiene-1,3 is prepared from the following, in which the parts are by weight:

| | Parts |
|---|---|
| Methyl methacrylate | 320 |
| Butadiene-1,3 | 80 |
| Sodium stearate | 20 |
| Potassium persulfate | 2.4 |
| Water | 760 |

The potasium persulfate is dissolved in a portion of the water to form a 3% solution, and the sodium stearate is dissolved in the remaining water. The solutions are then mixed and poured into a polymerization vessel. The methyl methacrylate is added to the mixture, and the butadiene-1,3 is added last. The mixture is polymerized with constant agitation at a temperature of about 50° C. The resultant latex is coagulated using conventional methods and the crumbs are washed and dried. The resin obtained is a horny material which can be milled. This resin is then mixed with a rubbery butadiene-1,3 methyl methacrylate copolymer prepared by using the same polymerization procedure as above with 200:200 ratio of monomers. The components and amounts thereof for the resin-rubber composition are as follows, parts being by weight:

| | Parts |
|---|---|
| 80:20 resinous methyl methacrylate:butadiene-1,3 copolymer | 45 |
| 50:50 rubbery butadiene-1,3:methyl methacrylate copolymer | 30 |
| Pearl-type animal glue | 15 |
| Titanium dioxide | 6 |
| Zinc stearate | 4 |

The resinous and rubbery copolymers are mixed on a mill at a temperature of about 180° F. and the other ingredients are added in the usual manner. The stock is cut from the mill and pieces of the sheet stock are cut and placed in golf ball cover shell molds and by application of heat and pressure (180° F. for 2 minutes at 300 p. s. i.) semispherical shells are produced. After these shells are trimmed, conventional golf ball centers are inserted between pairs of shells and the whole placed in a mold and heated to form the balls at 218° F. for a few minutes at a platen pressure of 300 p. s. i. The balls are then cooled while in the mold, the total heating and cooling cycle being 6 minutes. Then they are unloaded, buffed and painted.

*Example II*

The resinous 80:20 methyl methacrylate:butadiene-1,3 copolymer of Example I was blended with a rubbery butadiene-1,3:styrene copolymer as follows, the parts being by weight:

| | Parts |
|---|---|
| 80:20 resinous methyl methacrylate:butadiene-1,3 copolymer | 43 |
| 50:50 rubbery butadiene-1,3:styrene copolymer | 32 |
| Pearl-type animal glue | 15 |
| Titanium dioxide | 6 |
| Zinc stearate | 4 |

These ingredients are mixed on conventional rubber machinery and processed into golf ball covers substantially as in Example I.

*Example III*

A tough, horny, resinous copolymer is prepared by the method of Example I using 340 parts of methyl methacrylate and 60 parts of butadiene-1,3 (85:15 ratio). A similar copolymer is prepared from 280 parts of methyl methacrylate and 120 parts of butadiene-1,3 (70:30 ratio). These two resinous materials were then homogeneously mixed with a rubbery 50:50 methyl methacrylate butadiene-1,3 copolymer to provide the following composition, in which the parts are by weight:

| | Parts |
|---|---|
| 85:15 resinous methyl methacrylate:butadiene-1,3 copolymer | 19 |
| 70:30 resinous methyl methacrylate:butadiene-1,3 copolymer | 30 |
| 50:50 rubbery butadiene-1,3:methyl methacrylate copolymer | 26 |
| Pearl-type animal glue | 15 |
| Titanium dioxide | 6 |
| Zinc stearate | 4 |

These ingredients are mixed on a mill and processed into golf ball covers substantially as in Example I.

*Example IV*

The resinous 85:15 methyl methacrylate:butadiene-1,3 copolymer of Example III is blended with a rubbery 67:33 butadiene-1,3:acrylonitrile copolymer as follows, the parts being by weight:

| | Parts |
|---|---|
| 85:15 resinous methyl methacrylate:butadiene-1,3 copolymer | 38 |
| 67:33 rubbery butadiene-1,3:acrylonitrile copolymer | 36.75 |
| Pearl-type animal glue | 13.5 |
| Titanium dioxide | 7.75 |
| Zinc stearate | 4 |

The ingredients are mixed on a mill and processed into covers as in Example I.

*Example V*

The resinous 70:30 methyl methacrylate:butadiene-1,3 copolymer of Example III is blended with a rubbery copolymer of 50:50 butadiene-1,3:methyl methacrylate in the following recipe, the parts being by weight, and processed into golf ball covers substantially as described in Example I.

| | Parts |
|---|---|
| Resinous 70:30 methyl methacrylate:butadiene-1,3 copolyer | 60 |
| Rubbery 50:50 butadiene-1,3:methyl methacrylate copolymer | 15 |
| Pearl-type animal glue | 15 |
| Titanium dioxide | 6 |
| Zinc stearate | 4 |

*Example VI*

The resinous 85:15 methyl methacrylate:butadiene-1,3 copolymer of Example III is blended with a rubbery copolymer of 50:50 butadiene-1,3:styrene in the following recipe, the parts being by weight, and processed into golf ball covers substantially as described in Example I.

| | Parts |
|---|---|
| Resinous 85:15 methyl methacrylate:butadiene-1,3 copolymer | 35 |
| Rubbery 50:50 butadiene-1,3:styrene copolymer | 40 |
| Glue | 15 |
| Titanium dioxide | 6 |
| Zinc stearate | 4 |

The balls made with the cover compositions of Examples I to V were tested on a driving range by being propelled by mechanical means. The yardage of the drive was compared with that of a No. 1 grade control ball having a balata cover, because the distance achieved depends upon atmospheric conditions such as temperature, wind velocity, etc.

These driving tests show that balls with covers of these new compositions are generally better than No. 1 grade balls having conventional balata covers used as a control. The cut resistance of these compositions is excellent. The tensile strength and the elongation of the cover compositions approximates that of the balata cover. The increase in distance of the drive is an all important feature of these covers, an increase of from 1 to 5 yards being considered a major improvement by those skilled in the art.

The rubbery polymer component will vary from about 20% to 200% by weight of the resinous polymer component. Also several rubbery polymers may be used in a single cover composition in a total amount within the above range as well as several resins prepared according to the present invention. The rubbery polymer may be added in admixture with from 20% to 125% its weight of pearl-type animal glue. Other compounding ingredients may be added to provide the desired color or other physical properties. These compositions may or may not be vulcanized as desired. By adding a vulcanizing agent to any of these compounds, with no other necessary change in proportions, vulcanizable compounds are provided. This flexibility is advantageous since both vulcanized and unvulcanized compositions have advantages which make them desirable for certain applications.

If no accelerator or vulcanizing agent is used, the compositions are used to form half shells, and these shells are pressed about golf ball centers by the application of heat and pressure. Heat is used here for molding but not for curing as such.

My invention is not limited to the specific examples listed herein for illustration. Rather the invention covers golf ball covers utilizing blends of a rubbery component and a resinous component and to golf balls so covered as defined in the following claims.

The present application is a continuation-in-part of my copending application S. N. 140,958, filed January 27, 1950, and since abandoned.

I claim:
1. In combination, a golf ball having a center and a cover secured thereto, said cover formed of a composition comprising a tough, horny, resinous copolymer consisting essentially of from 60 to 90% by weight of a monomer of an alkyl ester of an alkyl acrylic acid of the general formula

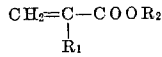

where $R_1$ is an alkyl group having from 1 to 3 carbon atoms and $R_2$ is an alkyl group having from 1 to 8 carbon atoms polymerized with from 40 to 10% by weight of a monomer of a diene and from 20 to 200% by weight of said resinous copolymer of a rubbery polymer selected from the group consisting of a homopolymer of a diene monomer, a copolymer of a mixture of diene monomers and a copolymer of from 50 to 75% by weight of a diene monomer and the balance a copolymerizable monomeric material having a single carbon to carbon double bond, said diene in said resinous copolymer and in said rubbery polymer being an open-chain conjugated diene having from 4 to 8 carbon atoms and being selected from the group consisting of hydrocarbons and halogenated hydrocarbons, and said rubbery polymer being vulcanizable at the time of mixing with said resinous copolymer to form said composition.

2. In combination, a golf ball having a center and a cover secured thereto according to claim 1 wherein said composition contains additionally from 20 to 125% by weight of said rubbery polymer of pearl type animal glue.

3. In combination, a golf ball having a center and a cover secured thereto, said cover formed of a composition comprising a tough, horny, resinous copolymer consisting essentially of from 60 to 90% by weight of methyl methacrylate monomer and the balance butadiene-1,3 monomer and from 20 to 200% by weight of said resinous copolymer of a rubbery copolymer containing from 50 to 75% by weight of butadiene-1,3 monomer and the balance methyl methacrylate monomer, said rubbery copolymer being vulcanizable at the time of mixing with said resinous copolymer to form said composition.

4. In combination, a golf ball having a center and a cover secured thereto, said cover formed of a composition comprising a tough, horny, resinous copolymer consisting essentially of from 60 to 90% by weight of methyl methacrylate monomer and the balance butadiene-1,3 monomer and from 20 to 200% by weight of said resinous copolymer of a rubbery copolymer containing from 50 to 75% by weight of butadiene-1,3 monomer and the balance styrene monomer, said rubbery copolymer being vulcanizable at the time of mixing with said resinous copolymer to form said composition.

5. In combination, a golf ball having a center and a cover secured thereto, said cover formed of a composition comprising a tough, horny, resinous copolymer consisting essentially of from 60 to 90% by weight of methyl methacrylate monomer and the balance butadiene-1,3 monomer and from 20 to 200% by weight of said resinous copolymer of a rubbery copolymer containing from 50 to 75% by weight of butadiene-1,3 monomer and the balance acrylonitrile monomer, said rubbery copolymer being vulcanizable at the time of mixing with said resinous copolymer to form said composition.

6. In combination, a golf ball having a center and a cover secured thereto, said cover formed of a composition comprising a tough, horny, resinous copolymer consisting essentially of from 60 to 90% by weight of ethyl methacrylate monomer and the balance butadiene-1,3 monomer and from 20 to 200% by weight of said resinous copolymer of a rubbery copolymer containing from 50 to 75% by weight of butadiene-1,3 monomer and the balance ethyl methacrylate monomer, said rubbery copolymer being vulcanizable at the time of mixing with said resinous copolymer to form said composition.

7. In combination, a golf ball having a center and a cover secured thereto, said cover formed of a composition comprising a tough, horny, resinous copolymer consisting essentially of 70% by weight of methyl methacrylate monomer and the balance butadiene-1,3 monomer and from 20 to 200% by weight of said resinous copolymer of a rubbery copolymer containing 50% by weight of butadiene-1,3 monomer and the balance methyl methacrylate monomer, said rubbery copolymer being vulcanizable at the time of mixing with said resinous copolymer to form said composition.

References Cited in the file of this patent

UNITED STATES PATENTS

| | | |
|---|---|---|
| 2,109,948 | Olin | Mar. 1, 1938 |
| 2,218,362 | Starkweather et al. | Oct. 15, 1940 |
| 2,232,515 | Arnold et al. | Feb. 18, 1941 |
| 2,643,125 | Juve | June 23, 1953 |

FOREIGN PATENTS

| | | |
|---|---|---|
| 345,939 | Great Britain | Mar. 16, 1931 |